Inventor,
Philip F. Morgan
Schneider, Dressler, Goldsmith & Clement,
Attys.

Oct. 16, 1962 P. F. MORGAN 3,058,908
METHOD OF DISPERSING GASES
Filed Jan. 29, 1959 2 Sheets-Sheet 2
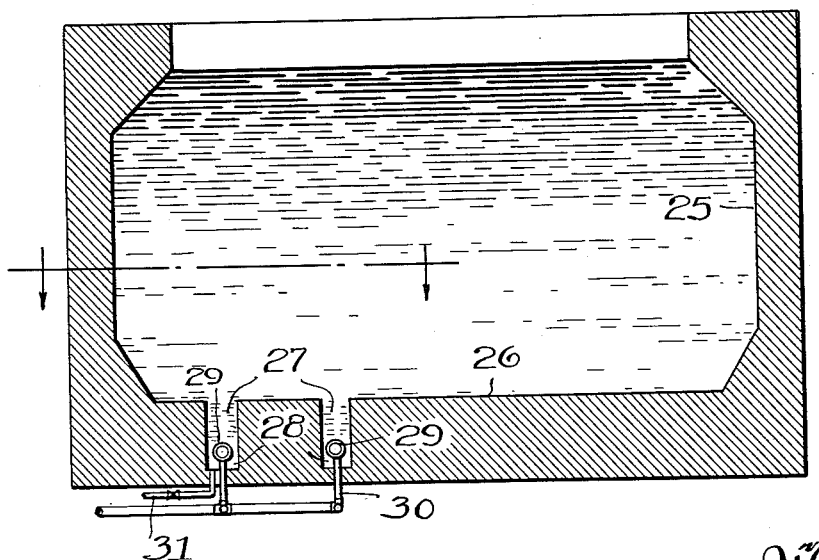
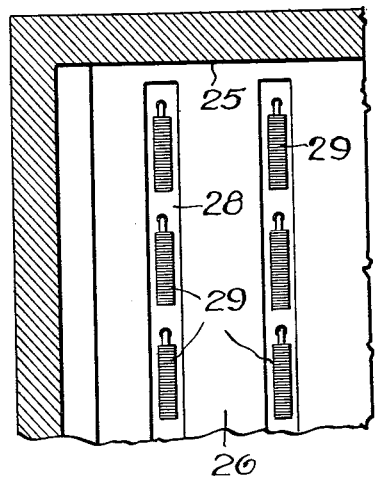
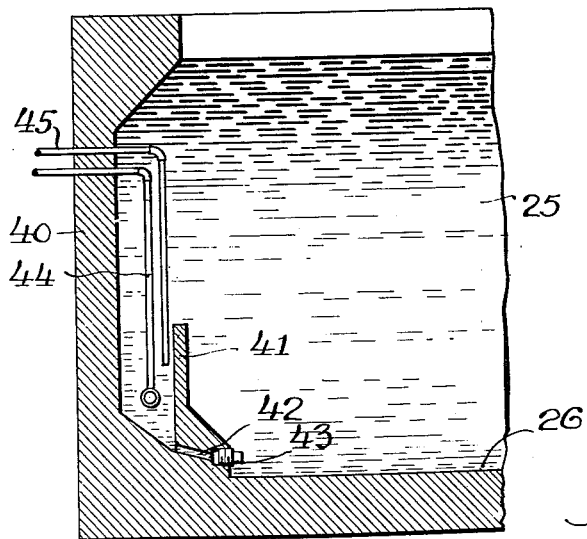
Inventor,
Philip F. Morgan
Schneider, Dressler, Goldsmith & Clement,
Attys.

3,058,908
United States Patent Office
Patented Oct. 16, 1962

3,058,908
METHOD OF DISPERSING GASES
Philip F. Morgan, Iowa City, Iowa, assignor, by mesne assignments, to FMC Corporation, a corporation of Delaware
Filed Jan. 29, 1959, Ser. No. 789,814
6 Claims. (Cl. 210—15)

This invention relates to the contacting of gases with liquid mediums. More particularly, it relates to a method and apparatus for dispersion of gas in small bubble form. Still more particularly, it relates to a gas diffusion system in which air or gas is supplied to a liquid system under pressure without attempt to control bubble size within any particular size range initially and in which the gas by interaction of gas bubbles and liquid is broken down and dispersed as small size bubbles.

The gas diffusion accomplished by this invention is a type having utility in the activated sludge process of treating sewage, in ore flotation processes, in the treatment of industrial wastes, in various fermentation processes, for example, for the manufacture of yeast and penicillin and in chemical processes such as hydrogenation or oxygenation.

Gas absorption in liquids is dependent upon the surface contact area. The smaller the bubble size the greater the surface area per unit of volume and the better the gas absorption. Treatment of, for example, sewage in activated sludge requires the use of large quantities of air. This air, for efficient operation, must be distributed through the sewage in the form of small gas bubbles, preferably of a size no greater than about 5 mm. in diameter.

Heretofore it has been the usual practice to provide plates or tubes of porous or foraminous material at or near the bottom of the tanks through which to deliver the gas. Although many types of materials have been used in the fabrication of diffusers, few have been practical to an extent warranting wide commercial use. In efforts to achieve greater efficiency of gas absorption, diffusers have been developed, such as perforated plastic tubing, needle punctured rubber tubing, ceramic tubes, perforated metal tubes with or without rope or cord winding and the like, to reduce the size of the bubbles diffused into the liquid.

A factor in gas dispersion has been clogging of the pores of small bubble diffusers. Particulate solids are carried into the pores and lodged therein too tightly for removal by normal blowing or wash operations by the gas stream or by backflow liquor when the air supply is shut off. In addition, calcium and iron compounds tend to deposit as external coatings on the diffusers interfering with gas dispersion.

Operating difficulties arising from attempts to introduce only relatively small gas bubbles into the liquid medium have on occasion made it necessary to diffuse large or coarse bubbles in spite of the low efficiency attained.

When large bubbles are discharged into a liquid, for example, into the bottom of a conventional aeration tank, the bubbles rise. In their upward flow, large bubbles are partially broken up into smaller size bubbles. While the smaller size bubbles may experience some disintegration, a large proportion of these bubbles remain intact. Gas discharged by a coarse or large bubble diffuser will form, in water or in liquids having a density approaching that of water, bubbles varying in size up to 30 mm. or more in diameter. Appreciable reduction in the size of bubbles of gas which are discharged into the bottom of open tanks occurs during the first 5 to 10 feet of travel through the liquid. At the time of approach of bubbles to the free liquid surface of the open tanks, the rising bubbles produced by disintegration of larger bubbles are, in general, not reduced to a size comparable to the size of bubbles dispersed into liquids by fine bubble diffusers.

In a study with a column having a large bubble diffuser adjacent the bottom thereof, it has been discovered that when air is released at the bottom of a narrow tube, closed at the bottom, countercurrent flow of the rising column of air and water and of the down flowing water which is moving to replace the water carried up in the air-water mixture, produces conditions whereby larger gas bubbles are reduced to smaller size bubbles with the result that a final dispersion is produced which is comparable to that attained with fine bubble diffusers in open tanks and having a size not greater than 5 mm. in diameter.

While it is not the intention to be tied to a theory of operation, the bubble breakup is believed due to hydraulic shear resulting from the turbulence induced by the countercurrently moving streams. This interaction of streams, effecting a hydraulic shearing of the gas bubbles, permits the introduction of gas bubbles having a wide range of sizes into the bottom of the column.

Apparatus for carrying out the aeration of liquid mediums consists of a tank adapted for batch operation or adapted for continuous flow of liquid medium therethrough. This tank or holding zone has a gas dispersal unit positioned either within the tank and with the outlet below the normal liquid level in said tank or with the unit partially or wholly outside the said tank but with the outlet of the gas dispersal unit in communication with the interior of said tank. A gas dispersal unit comprises a lateral wall member creating a space or zone of limited cross sectional area. Closure means, for example, a bottom wall shuts off one end of the elongated space.

Adjacent to the bottom wall, and within the space isolated by the lateral wall member is mounted one or more gas discharge means. Such means may be adapted to introduce gas in any of a wide variety of bubble sizes and may consist of open pipes, ceramic tubes, gas discharge nozzles, perforated tubes, with or without cord winding, or equivalent units.

Gas is fed to the discharge means at pressures sufficient to overcome hydrostatic head in the narrow tube but not at a rate sufficient to cause elimination of turbulent mixing of gas and liquid. Gas under pressure of about 3 to 20 lbs. per square inch gives satisfactory operation. The volume of gas discharged should at no time be such as to displace all or substantially all of the water from the tubular gas dispersal unit.

In its simpler form, the enclosure may be a tubular member having a closed bottom. The bottom closure may be provided with small drainage holes or other drainage means. Means for introduction of air is positioned interiorly and adjacent the bottom of this tubular member. The preferred tubular member is one having a cross-sectional configuration which will prevent the formation of a vortex, for example, square, rectangular, etc. Gas dispersal units of this type may be located, for example, along one side of a conventional aeration tank. The air-liquid mixture, leaving the top of the tubular member, will travel up through the liquid in an aeration tank and will induce the usual spiral flow type of circulation in a complete aeration tank.

The length of the tubular member necessary for initial confinement of the rising stream of gas-liquid mixture will depend upon, among other conditions, the cross sectional dimensions of the column, the density and viscosity of the liquid and possibly the concentration of suspended matter. For water or liquids, the gas-liquid mixture should be confined within a tubular member whose cross section has an area at least sufficient to permit countercurrent flow of liquid and liquid-gas mixture. The cross sectional area should not be so great as to allow circulation within the tubular member without the necessary hydraulic shearing action. The height of the confining tubular member above the gas discharge means should provide sufficient residence time to permit disintegration of bubbles by hydraulic shearing action. For example, it has been found that for a 6 to 9 inch square column, heights of 12 to 24 inches are preferred. When aerating water in a column 7 inches square and 18 inches in height, and having the outlet thereof submerged under a head of about 10 feet of water, more than 95% of the gas issuing from an open pipe at the bottom of the column, becomes dispersed as bubbles of less than 5 mm. diameter before escape from the liquid.

The primary requirement is that the quantity of gas discharged into the chamber does not displace so much water that the hydraulic shear action is substantially eliminated. If greater quantities of gas are required than can be properly discharged from a fixed dimension chamber, a chamber of greater dimensions and gas dischargers capable of handling the higher gas input may be arranged to co-operate to produce conditions maintaining the gas absorption rate at the higher input substantially the same as at the lower gas rate.

The capabilities and advantages of the invention will be apparent to those skilled in the art from the following description of preferred embodiments thereof taken in conjunction with the accompanying drawings in which:

FIG. 3 is a cross sectional view of an alternative arrangement particularly adaptable for sewage treatment tanks showing a channel type diffuser unit;

FIG. 4 is a top plan view of the tank shown in FIG. 3;

FIG. 5 is a fragmentary cross sectional view of an alternative apparatus arrangement having the gas dispersal unit as a channel member positioned along the side of a tank.

Figure 1:
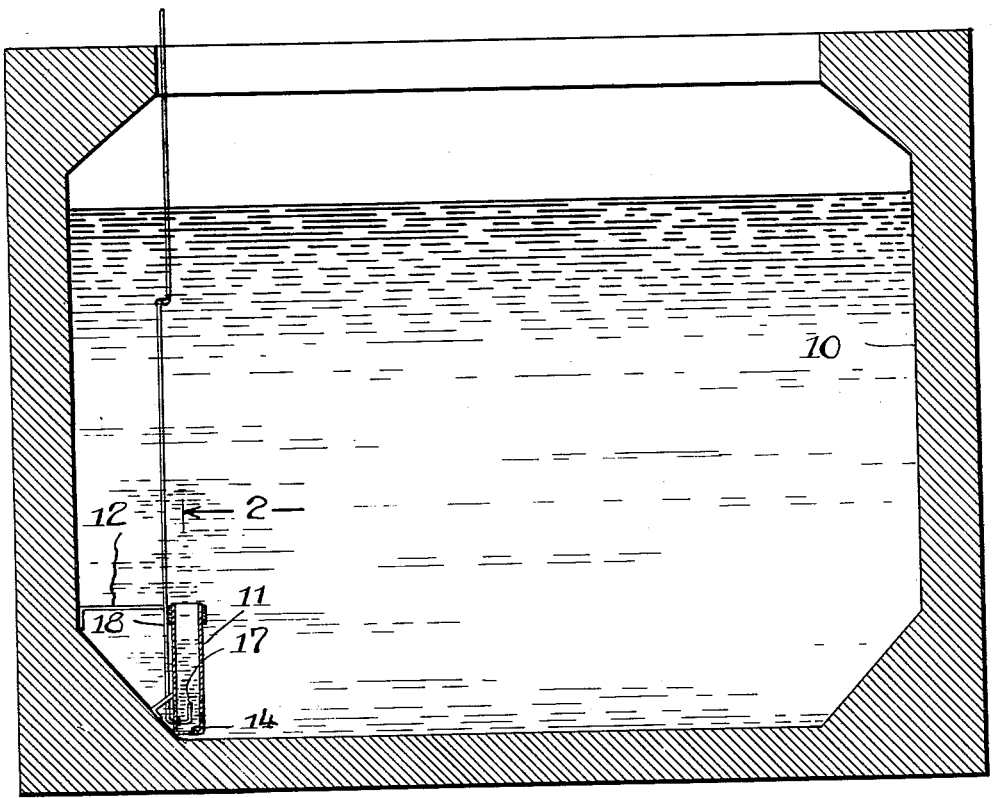
FIGURE 1 is a cross sectional view of a tank with a gas dispersal unit or tube positioned wholly within the confines of the tank.
Figure 2:
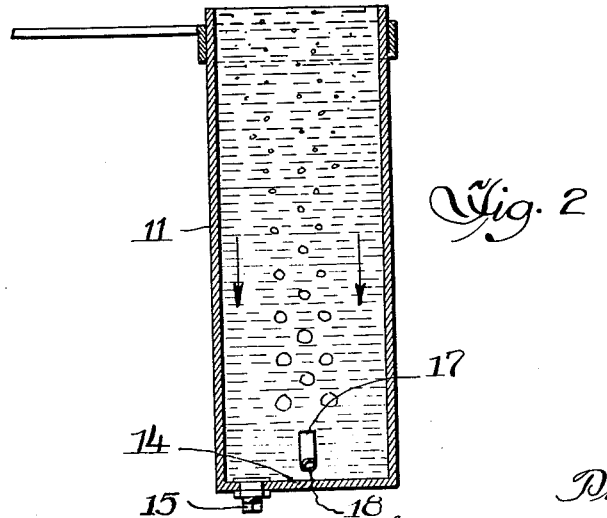
FIG. 2 is an elevational view of the gas dispersal unit along the line 2—2 of FIGURE 1.

Referring to the drawings in FIGS. 1 and 2, the numeral 10 indicates a large tank such as is used for treatment of waste material as in the production of activated sludge. Tank 10 may be of any suitable construction such as metal, concrete, and the like. Mounted within tank 10 and adjacent one side thereof is a square cross section gas dispersal chamber or tubular member 11. Tubular unit 11 is positioned with regard to the tank walls by suitable anchors 12 and 13.

Tubular member 11 is closed at the bottom by wall member 14. Wall member 14 may be provided with one or more ports 15 for drainage purposes. Mounted within the tubular member 11 is means for gas introduction 17. Gas is supplied to the means 17 through a pipe 18. Pipe 18 is connected to an adequate supply of gas maintained under pressure. The pipe 18 may be of the type with an elbow connecting two pipe sections. The first pipe section may be pivotally connected to a connector to a source of air and adapted for movement in a vertical plane. The second pipe section is also mounted for movement in a vertical plane. The second pipe section supports the lateral wall member 14 through suitable braces and terminates at discharge means positioned within the lateral wall members. When connected to suitable means for obtaining movement of the pipe sections, this combination lets the pipe sections depend for positioning the air dispersal unit deep in the tank and may fold for withdrawing the air dispersal unit from its submerged position. Gas is usually supplied to the gas discharge means in such systems under pressures to overcome hydrostatic head, preferably of 3 to 20 pounds per square inch gauge.

FIG. 2 provides a side elevational view of the tubular member 11. Tubular member 11 is herein illustrated as a square chamber formed of metal tubing closed at the bottom by wall member 14. Wall member 14 is provided with the aforesaid ports 15 which are adapted to receive suitable closure means 16 such as threaded plugs. Mounted within tubular member 11 is means for gas introduction 17. Means is secured to a gas pipe 18 which may enter tubular member 11 through the bottom wall 14.

FIGS. 3 and 4 illustrate an alternative construction particularly adaptable for use in waste disposal plants where appreciable quantities of solids are present in the material to be treated. This apparatus consists of a tank 25 of conventional design. Tank 25 is adapted with a bottom portion 26 having therein one or more ports or slots herein illustrated as two slots 27.

Slots 27 are the outlet openings for sumps or channels 28 which are of the same cross sectional configuration and size as the slots 27. Channels 28 may be arranged to be parallel to or tranverse to any particular axis of the tank. Channels 28 are each provided with one or more gas discharge heads 29 supplied with hydrocarbon gas or air from a source not shown through connecting pipes 30. Suitable means 31, such as a conduit, is provided at the bottom of channels 28 for draining liquid therefrom.

FIG. 5 illustrates an alternative construction particularly adaptable for large size tanks. This apparatus consists of a tank 40. Tank 40 is provided with a longitudinal partition 41 extending along the side of the tank and spaced therefrom, usually about 6 to about 12 inches. The space between partition 41 and the tank wall is provided with drainage means 42 such as pipes adapted to be sealed by plugs 43 when the tank is in operation. Mounted within in the space are gas discharge heads supplied with gas from a source not shown through pipe 44. Additionally there may be mounted within the space a pipe 45 which conveys recycle sludge to tank 40 from a source not shown. Each gas discharge head may be positioned within segments of the chamber formed between partition 41 and the tank wall by cross walls.

While the invention has been described with reference to three apparatus arrangements other arrangements will be readily suggested to those skilled in the art.

The above described apparatus may be effectively and efficiently utilized in the treatment of sewage. Raw sewage as it reaches a treatment plant contains floating and suspended material. In a modern sewage disposal plant, the sewage may flow through a grit chamber and comminutor and then through a primary settling tank.

Primary effluent or raw sewage may be subjected to aeration treatment in equipment decribed with relation to FIGS. 1 and 2 as a substitute for conventional apparatus. Primary effluent or raw sewage is mixed with recycled activated sludge and fed to the aeration tank. Solids contents of the mixture varies considerably but is generally held to within the range of 600 to 4,000 p.p.m. Air may be supplied from positive displacement or centrifugal blowers. The air is supplied adjacent the bottom of the multiplicity of gas dispersal units aligned along one side of the tank, in quantities to supply generally between 2.5 and 25 cubic feet of air per minute per foot of tank length. The top of the gas dispersal unit is positioned for example, 10 to 15 feet below the surface of the liquid in a tank filled to a depth of 15 feet. An open pipe or any other type of coarse bubble discharger releases gas into the gas dispersal chamber of a size varying from about 5 to about 30 mm. diameter. If treating primary effluent, this mixture is detained in the aeration tank in accordance with usual practice depending upon the strength of the sewage.

The method of contacting liquid and gaseous mediums and the apparatus herein described are also applicable to such treatments as the anaerobic digestion or accelerated digestion of sludge. In these processes, compressed gases, including gas generated during the digestion process are utilized both for improving the growth of organisms which decompose the sludge but also to produce motion in the material undergoing digestion.

Anaerobic digestion of sludge may be applied to raw sewage, to primary sludge, or to mixtures of primary sludge and activated sludge obtained by aeration of sewage materials. In such anaerobic digestions, gas such as methane-containing gas is introduced by means of a gas dispersal device located preferably near the bottom and center of the sludge treating tank. Better dispersion of the gas in accordance with the foregoing description, results in improvement in the anaerobic digestion operation.

In either the aerobic or anaerobic systems of sewage treatment, the recycle activated sludge or the recycled seed sludge may be introduced into the zone of limited cross-sectional area.

By restricted cross sectional area as compared with said holder is meant a cross sectional area which is only a fraction of the cross sectional area of the holding tank containing the main body of liquid to be aerated.

The gas diffusion system herein before described is useful in the field of sewage and waste treatment, in addition to activated sludge processes, for such application as in oxidation ponds, stream aeration, aerated grit chambers, digesters, preaeration tanks, reaeration tanks, etc.

Although the invention has been described in connection with specific embodiments thereof, it will be understood that these are not to be regarded as limitations upon the scope of the invention except insofar as included in the accompanying claims.

I claim:

1. The method of contacting liquid and gaseous mediums which comprises segregating a portion of a main body of liquid in a confined space closed at the sides and at the bottom and open at the top for communicaion with the main body of liquid in a region below the surface of the main body of liquid, introducing gaseous medium substantially free of liquid under pressure into said confined space below the open top thereof so that the gas will mingle with the liquid and form a gas-liquid mixture which rises in said confined space and passes therefrom into the main body of liquid above said space, while said gas-liquid mixture rises in said confined space, flowing liquid from said main body into said confined space in countercurrent contact with said upwardly rising gas-liquid mixture to impose hydraulic shearing forces on the gas in said gas-liquid mixture and thereby subdivide the gas into small bubbles, and continuing the introduction of the said gas and the said liquid into said confined space to provide for a continued countercurrent contact of liquid flowing into said confined space with a gas-liquid mixture rising therefrom whereby small bubbles of gas are continuously introduced into said main body of liquid as long as the gas is introduced into said confined space.

2. The method of contacting sewage and air which comprises segregating a portion of a main body of sewage in a confined space closed at the sides and at the bottom and open at the top for communication with the main body of sewage in a region below the surface of the main body of sewage, introducing air substantially free of liquid and under pressure into said confined space below the open top thereof so that the air will mingle with the sewage and form an air-sewage mixture which rises in said confined space and passes therefrom into the main body of sewage above said space, while said air-liquid mixture rises in said confined space, flowing sewage from said main body downward into said confined space in countercurrent contact with said upwardly rising air-sewage mixture to impose hydraulic shearing forces on the air bubbles in said air-sewage mixture and thereby subdivide the air into small bubbles and continuing the introduction of air into said confined space to provide for a continued countercurrent contact of liquid flowing into said confined space with an air-sewage mixture rising therefrom whereby small bubbles of air are continuously introduced into said main body of sewage as long as the air is introduced into said confined space.

3. The method of contacting liquid and gaseous mediums which comprises segregating a portion of a main body of liquid in a confined space closed at the sides and at the bottom and open at the top for communication with the main body of liquid, introducing gaseous medium substantially free of liquid under pressure into said confined space below the open top thereof in quantities to produce a rising column of gas bubbles and liquid, said bubbles being predominantly of a size in the range between 5 and 30 mm. in diameter, so that the gas will mingle with the liquid and form a gas-liquid mixture which rises in said confined space and passes therefrom into the main body of liquid above said space, while said gas-liquid mixture rises in said confined space, flowing liquid from said main body into said confined space in countercurrent contact with said upwardly rising gas-liquid mixture to impose hydraulic shearing forces on the gas in said gas-liquid mixture and thereby subdivide the gas into small bubbles predominantly of a size less than 5 mm. in diameter and continuing the introduction of the said gas and the said liquid into said confined space to provide for continued countercurrent contact of liquid flowing into said confined space with a gas-liquid mixture rising therefrom whereby the small bubbles of gas are continuously introduced into said main body of liquid as long as the gas is introduced into said confined space.

4. The method of treating sewage which comprises mixing sewage with activated sludge to form a main body of aqueous sewage having a solids content between about 600 and 4,000 parts per million, segregating a portion of the main body of aqueous sewage in a confined space closed at the sides and at the bottom and open at the top for communication with the main body of sewage in a region below the surface of the main body of sewage, introducing gaseous medium substantially free of aqueous medium and under pressure into said confined space through a coarse bubble discharger producing bubbles of a size in the range between 5 and 30 mm. in diameter in quantities to supply between 2.5 and 25 cubic feet of air per minute per foot of tank length, below the open top thereof so that the gas will mingle with the sewage and form a gas-sewage mixture which rises in said confined space and passes therefrom into the main body of sewage above said space, while said gas-liquid mixture rises in said confined space, flowing sewage from said main body into said confined space in countercurrent contact with said upwardly rising gas-sewage mixture to impose hydraulic shearing forces on the gas in said gas-sewage mixture and thereby subdivide the gas into small bubbles and continuing the introduction of the said gas and the said liquid into said confined space to provide for a continued countercurrent contact of sewage flowing into said confined space with a gas-sewage mixture rising therefrom whereby small bubbles of gas are continuously introduced into said main body of sewage as long as the gas is introduced into said confined space.

5. The method of treating sewage which comprises segregating a portion of a main body of aqueous medium consisting of aqueous sewage mixed with activated sludge in a confined space closed at the sides and at the bottom and open at the top for communication with the main body of aqueous medium in a region below the surface of the main body of aqueous medium, introducing air substantially free of aqueous medium and under pressure into said confined space below the open top thereof so that the air will mingle with the liquid and form an air-aqueous medium mixture which rises in said confined space and passes therefrom into the main body of aqueous medium above said space, while said air-aqueous medium mixture rises in said confined space, flowing aqueous medium from said said main body into said confined space in countercurrent contact with said upwardly rising air-aqueous medium mixture to impose hydraulic shearing forces on the air bubbles in said air-aqueous medium mixture and thereby subdivide the air bubbles into small bubbles and continuing the introduction of air into said confined space to provide for a continued countercurrent contact of aqueous medium flowing into said confined space with a mixture rising therefrom whereby small bubbles of air are continuously introduced into said main body of aqueous medium as long as the air is introduced into said confined space.

6. The method of treating sewage sludge by anaerobic digestion which comprises segregating a portion of a main body of liquid sewage sludge in a confined space closed at the sides and at the bottom and open at the top for communication with the main body of liquid in a region below the surface of the main body of liquid sewage sludge, introducing methane-containing gas substantially free of liquid and under pressure into said confined space through gas discharge means producing bubbles of a size substantially in the range between 5 and 30 mm. in diameter below the open top thereof so that the methane-containing gas will mingle with the liquid and form a gas-liquid sewage sludge mixture which rises in said confined space and passes therefrom into the main body of liquid above said space, while said gas-liquid sewage sludge mixture rises in said confined space, flowing liquid sewage sludge from said main body into said confined space in countercurrent contact with said upwardly rising methane-containing gas-liquid sewage sludge mixture to impose hydraulic shearing forces on the gas in said methane-containing gas-liquid sewage sludge mixture and thereby subdivide the methane-containing gas into small bubbles and continuing the introduction of methane-containing gas into said confined space to provide for a continued countercurrent contact of liquid sewage sludge flowing into said confined space with a methane-containing gas-liquid sewage sludge mixture rising therefrom whereby small bubbles of gas are continuously introduced into said main body of liquid sewage sludge as long as the methane-containing gas is introduced into said confined space.

References Cited in the file of this patent

UNITED STATES PATENTS

| | | |
|---|---|---|
| 972,183 | Guntrum | Oct. 11, 1910 |
| 978,667 | Sicka | Dec. 13, 1910 |
| 1,983,805 | Munson et al. | Dec. 11, 1934 |
| 2,008,363 | Maris | July 16, 1935 |
| 2,144,385 | Nordell | Jan. 17, 1939 |
| 2,242,139 | Munroe | May 13, 1941 |
| 2,574,685 | Baxter et al. | Nov. 13, 1951 |
| 2,786,025 | Lamb et al. | Mar. 19, 1957 |

FOREIGN PATENTS

| | | |
|---|---|---|
| 441,851 | Germany | Jan. 20, 1925 |